United States Patent [19]

Thompson

[11] Patent Number: 5,366,189
[45] Date of Patent: Nov. 22, 1994

[54] SHOPPER'S CADDY

[76] Inventor: Thomas P. Thompson, 38 Camino Katia, San Clemente, Calif. 92672-9420

[21] Appl. No.: 130,268

[22] Filed: Oct. 1, 1993

[51] Int. Cl.5 .............................. A63B 55/04
[52] U.S. Cl. ........................ 248/97; 224/42.42; 248/99; 248/150
[58] Field of Search .............. 248/97, 99, 100, 95, 248/150; 211/12; 224/42.42

[56] References Cited

U.S. PATENT DOCUMENTS

| | | | |
|---|---|---|---|
| 3,986,656 | 10/1976 | November | 229/15 |
| 4,358,958 | 11/1982 | Wehrenber | 248/150 X |
| 4,538,737 | 9/1985 | Delaney | 224/42.42 X |
| 4,718,584 | 1/1988 | Schoeny | 224/42.42 |
| 4,930,734 | 6/1990 | Schmidt | 248/97 |
| 5,050,825 | 9/1991 | Bratset | 248/97 |
| 5,054,724 | 10/1991 | Hutchenson | 248/100 X |
| 5,131,499 | 7/1992 | Hoar | 248/100 R |
| 5,161,700 | 11/1992 | Stannis et al. | 211/175 |

Primary Examiner—Ramon O. Ramirez
Attorney, Agent, or Firm—Poms, Smith, Lande & Rose

[57] ABSTRACT

A shopper's caddy for supporting filled plastic grocery bags during transportation from a store to a consumer's home, for example, includes a pair of panel members which interconnect in cruciform configuration to provide four bag-receiving areas in which filled bags may be hung from the panels. The pair of panels include bag-hanging features adjacent to the end edges thereof so that the integral loop handles of the grocery bags may hang from the panels. Part of the weight of the filled bags rests upon a floor supporting the caddy, and the remainder of the grocery weight is transferred to the caddy to stabilize this caddy on the floor. The hanging features may also accept additional filled bags at corresponding ends of the panels so that the caddy in one configuration may support a dozen filled grocery bags. The caddy knocks down to only two flat panels which are easily stored in an automobile trunk, for example.

20 Claims, 2 Drawing Sheets

SHOPPER'S CADDY

BACKGROUND OF THE INVENTION

1. Field of the Invention

The present invention is in the field of caddies, holders, area dividers, stands, and package holding structures. More particularly, the present invention relates to a support structure, or "caddy", which is particularly adapted to support filled plastic grocery bags in an upright position on a floor so that the contents of the limp plastic bags do not spill therefrom. Still more particularly, the present invention relates to such a caddy which is supportable upon a floor or other generally flat support surface, and which in part suspends the supported plastic grocery bags so that a portion of the weight of the groceries is supported on the floor, and the remaining grocery weight transfers to the caddy to stabilize the latter and the grocery bags. The caddy is particularly configured to have a high utility for use in the trunk of a car, for example, to support filled grocery bags during transportation from a store to the consumer's home. An embodiment of the caddy is configured to knock down to two flat panels for convenient storage, and one particularly preferred embodiment uses two identical cooperative and reversible panels to form the caddy.

2. Related Technology

As is well known, grocers are increasingly turning to the use of thin-film plastic grocery bags because of the cost and environmental advantages of these bags over the conventional paper bags. The plastic grocery bags have a number of environmental advantages including the saving of forest land, reduced volume and weight, reduced shipping costs, and reduced shipping fuel uses compared to paper grocery bags. However, consumer acceptance of these limp thin-film plastic grocery bags has not been completely favorable. Many consumers are very irritated upon arriving home to find their groceries have spilled from the limp plastic bags. For this reason, some consumers have continued to insist on the use of paper grocery bags, and grocers have been forced to continue to make these more expensive and more environmentally costly paper bags available, rather than to risk losing customers in a very competitive market.

A conventional collapsible package holding structure, or area divider, is known in accord with U.S. Pat. No. 3,986,656, issued Oct. 19, 1976 to D. November. This area divider is believed to include a hinged rectangular frame into which is received a pair of interconnected V-shaped foldable dividers, which cooperatively divide the area within the frame into compartments. These compartments may receive filled paper grocery bags to assist in supporting the bags in an upright position on the floor of an automobile trunk, for example. Both the hinged frame and the foldable dividers may be folded flat for storage of the area divider.

However, with an area divider as taught by the patent to November, the currently popular plastic grocery bags would not be supported so that the contents of filled bags could still escape from the bags during transportation.

Another conventional automotive accessory is known in accord with U.S. Pat. No. 4,718,584, issued Jan. 12, 1988, to J. T. Schoeny. This accessory includes a base, a back flap hinged to the base, and at least a pair of side flaps hinged to the back flap. The back flap may be pivoted to a vertical position, and the side flaps be pivoted also to vertical positions essentially perpendicular to the back flap in order to divide the area within an automobile trunk or station wagon into open-topped enclosures, which are intended to confine small articles during movement of the automobile.

The accessory taught by the Schoeny patent suffers from the same drawback as the November patent with respect to transportation of filled plastic grocery bags. In other words, the limp plastic grocery bags can still allow their contents to escape even when confined in enclosures or compartments like those taught by November or Schoeny.

U.S. Pat. No. 5,050,825, issued Sep. 24, 1991, to D. Bratset, is believed to teach a conventional support for plastic grocery bags. The support taught by the Bratset patent appears to include a plate-like base member which may rest upon a floor. The base member includes plural pairs of V-shaped receptacles, or slots, into which depending tabs may be inserted. The depending tabs are formed in pairs along the lower edge of a foldable upright member. The paired tabs are disposed on opposite sides of a fold line of the upright member so that when the tabs are received into the slots of the base, the upright member forms a zig-zag configuration. At its upper edge, the upright member forms plural protrusions intended to receive the integral handles of filled plastic grocery bags. Accordingly, the filled bags may be supported for transportation. When the base and upright member are separated, the upright member may be accordion folded to a small size for storage.

With a support structure like that taught by the Bratset patent, the user must engage plural tabs into plural slots in order to prepare the structure for use. This requirement significantly reduces the convenience of use of the support structure. Also, adjacent filled grocery bags hang against one another. There is only the single upright member which may serve as a partition between bags containing breakable glass containers, for example. During transportation, such containers may knock against one another resulting in breakage of one or more of the containers. Also, the grocery bags containing crushable or fragile articles can not conveniently be separated from the bags with heavy articles, so that the fragile or crushable article may also be damaged as the consumer transports them home.

Finally, a rotary device for use at the checkout counter of retail stores is known in accord with U.S. Pat. No. 5,131,499, issued Jul. 21, 1992, to B. Hoar. The Hoar device includes a round turntable upon which plural upright panels cooperate to divide the turntable into sectors. Within the sectors the panels carry hooks upon which a supply of plastic grocery bags may be stored. The hooks are arranged in pairs on confronting panel faces so that a single plastic grocery bag may be opened within each sector of the turntable in preparation for filling of the bags with groceries.

The device taught by the Hoar patent is secured to the checkout stand at a store, is adjustable to match its height to the top surface of the checkout counter, and is not intended to be portable. Moreover, this device would not be convenient for transportation of grocery bags because it does not knock down or disassemble to a convenient size for storage.

In view of the deficiencies of the conventional devices and structures outlined above, there exists a need for a convenient, low-cost caddy for use in an automobile to support filled plastic grocery bags during transportation. The device should knock down to a convenient size to storage, and should provide a way of partitioning breakable, heavy, crushable, and fragile articles from one another. Also, the device should be easy and convenient both to prepare for use, and to knock down to storage after use.

SUMMARY OF THE INVENTION

In view of the above, a primary object for this invention is to provide a shopper's caddy which will support filled plastic grocery bags upon a floor during transportation so as to prevent the limp bags from spilling their contents.

Another object for the present invention is to provide such a shopper's caddy in which partitioning structure is provided to separate articles which may be damaged or which may damage other articles during transportation.

Yet another object is to provide such a shopper's caddy which assembles for use, and disassembles for storage, very quickly and easily.

Still another object for the present invention is to provide such a shopper's caddy which includes only a pair of inter-engaged or connected panel members which are mutually supporting and which provide support features for engagement by the integral loop handles of plastic grocery bags.

Another object for the present invention is to provide such a shopper's caddy in which the two panel members are identical with one another, and may be inverted for use in either of two possible positions in the caddy. This feature eases assembly of the caddy for use, and also improves its utility and durability because a damaged panel may still be used to assemble a complete and fully functional caddy.

Accordingly, the present invention provides a shopper's caddy apparatus for hangingly supporting upon a floor plural filled limp plastic grocery bags which each have a pair of integral loop handles, the shopper's caddy comprising a pair of complimentary mutually-supportive separable panel members which when interconnected form a mutually-supporting cruciform configuration in plan view, the cruciform configuration having four bag-receiving areas within which filled plastic grocery bags may hang from the pair of panel members and be partially supported upon the floor. Each one of the pair of panel members is generally rectangular in elevation view with a pair of opposite edges, one opposite edge of which may be a top edge for the panel when interconnected with the other panel of the pair, and a pair of side edges. Each panel member includes a pair of bag-engagement features on its top edge, each of which is adjacent to a corresponding one of the pair of side edges thereof. Each panel member further includes a centrally-located vertically-extending slot extending about half the central vertical dimension of the panel. This slot defines slot side surfaces which are supportingly engageable with the other of the pair of panel members when the latter are interconnected. Additionally, each panel member also defines a support surface aligned with the slot of that panel for supportingly engaging the slot side surfaces of the other of the pair of panel members.

The above and additional objects and advantages of the present invention will be apparent from a reading of the following detailed description of two exemplary preferred embodiments of the present invention, taken in conjunction with the following drawing Figures, in which the same reference numerals are used to designate the same feature of the inventive structure, or features which are analogous in structure or function.

DESCRIPTION OF THE EXEMPLARY PREFERRED EMBODIMENTS

Figure 1:
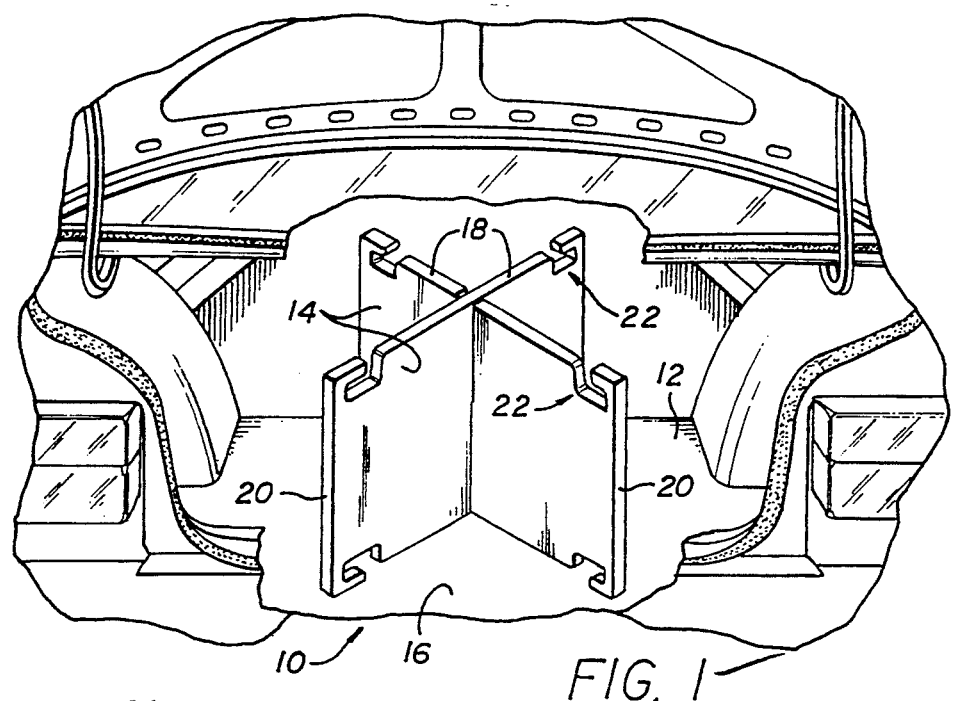
FIG. 1 provides a perspective view of a shopper's caddy embodying the present invention resting upon the floor of an automobile trunk.
Figure 5:
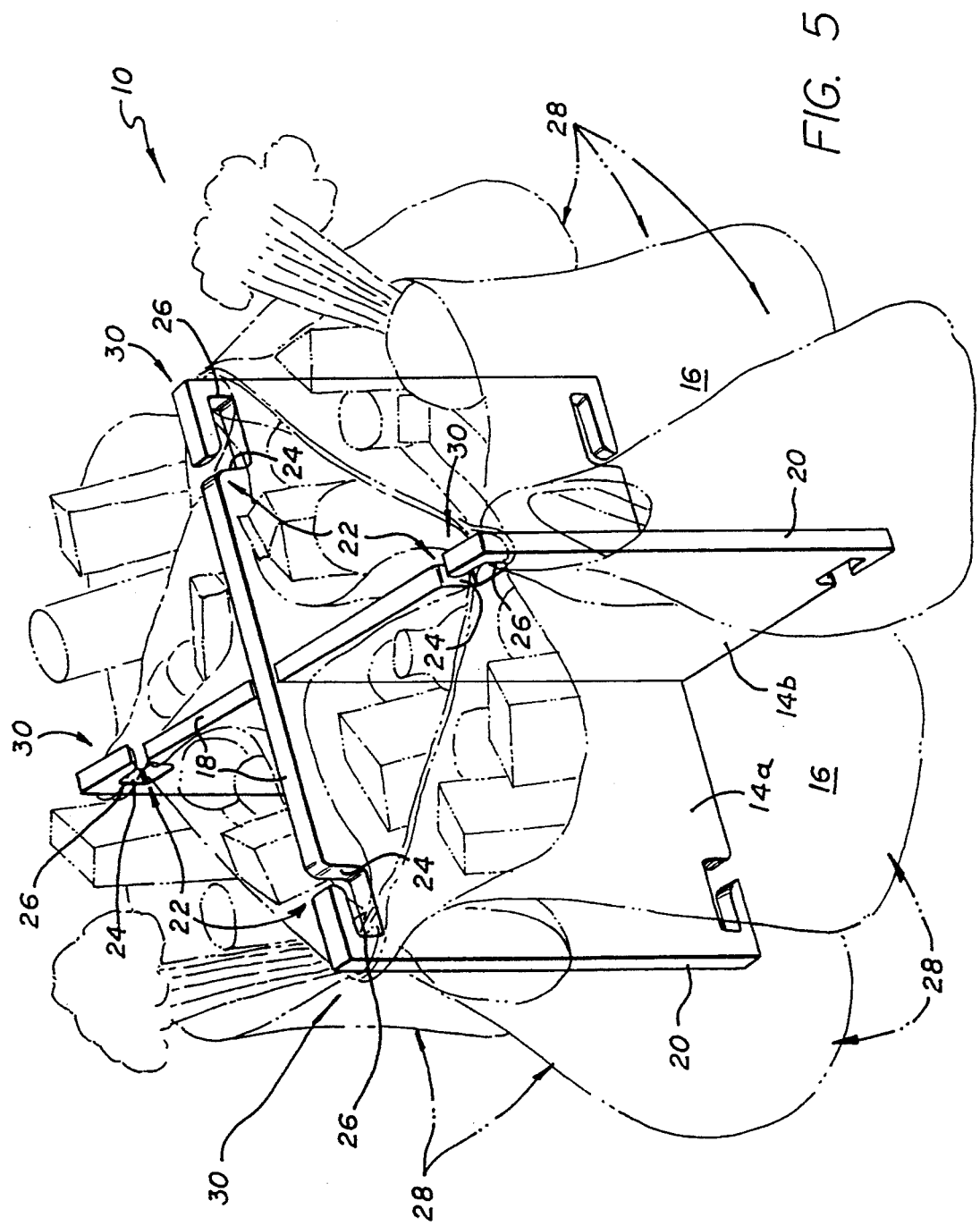
FIG. 5 provides a perspective view similar to FIG. 1, and showing the caddy supporting several filled plastic grocery bags, the bags and groceries being illustrated in phantom lines.

Viewing FIGS. 1-3, and 5 in conjunction, and referring first particularly to FIGS. 1 and 5, a shopper's caddy 10 embodying the present invention is shown upon the floor 12 of an automobile trunk. The shopper's caddy 10 includes a pair of panel members 14a and 14b, which are connected in interengaging and mutually supporting relation, as will be further explained. Viewing FIG. 2, it is seen that the panel members 14 in plan view form a cruciform, or X-shape. Between the panel members 14 when viewed in plan, four sector-shaped areas 16 are defined within which plastic grocery bags may be received and supported, as also will be further explained. Each of the panel members 14 defines an upper edge surface 18 which extends outwardly to intersect with a side edge surface 20. Adjacent each side edge surface, the top surface 18 of each panel defines a bag engagement feature, generally referenced with the numeral 22. This bag engagement feature 22 includes the top edge 18 of each panel defining a recess 24 with an inwardly disposed reentrant surface portion 26 adjacent to and spaced inwardly somewhat from each side edge 20.

FIG. 5 shows in phantom lines several filled plastic grocery bags 28 supported by the caddy in the areas 16 between panels 14, as well as a plastic grocery bag 28 supported at each end of each of the pair of panels 14a and 14b. The bags 28 in the area 16 are supported by having a corresponding one of their integral loop handles 30 placed over one of the engagement features 22 of one of the panels 14. Consequently, these grocery bags 28 span between the engagement features 22 of the pair of panels 14 to be supported in the areas 16 and on the floor 12. That is, part of the weight of the filled grocery bags is supported by the floor 12, and the remainder of the weight of each bag is supported by the caddy 10 so that the caddy is steadied by this weight.

The caddy 10 is configured and sized to accept a pair of grocery bags 28 into each of the areas 16. As discussed above, the user of the caddy 10 will ordinarily want to load the bags 28 into the areas 16 taking advantage of the partitioning provided by the panels 14. That is, grocery bags with heavy and hard items will not ordinarily be loaded into the same area 16 with bags having soft, crushable, and fragile items. The baggers at grocery stores are trained to fill grocery bags in such a way as to avoid mixing such items in the same bag, and the user of the caddy 10 can easily follow a similar scheme when loading the bags onto the caddy to prevent damage to the groceries in transit. Of course, the number of filled grocery bags 28 which are accepted into each area 16 is determined by the extent to which each bag is filled as well as the size of the caddy 10. The caddy 10 may be configured and sized to accept only a single filled grocery bag into each area 16, or may be sized to accept several filled plastic grocery bags into each area 16.

The filled grocery bags 28 disposed at the ends of each panel 14 are supported by having each of their two integral loop handles engaged over the engagement feature 22 of the corresponding panel. In the case where the caddy 10 is sized and configured to accept a pair of filled grocery bags 28 into each of the areas 16, and a bag is placed at each end of each panel member 14, the caddy 10 supports a dozen filled grocery bags on the floor 12. It should be noted that the caddy 10 is particularly easy to load ,and unload. To load the caddy, the user simply grasps one of the two integral loop handles 30 of the grocery bags 28 in each hand, and separates these loop handles to place them over the respective engagement features 22 as the bag is lowered into an area 16. When the caddy is to be unloaded, the handles 30 may be collected with one or two hands, so that the bags 28 are removed from the areas 16 in the reverse order of their loading. The single bags placed at the ends of the panels 14 have both of their handles placed over the same feature 22.

Figure 3:
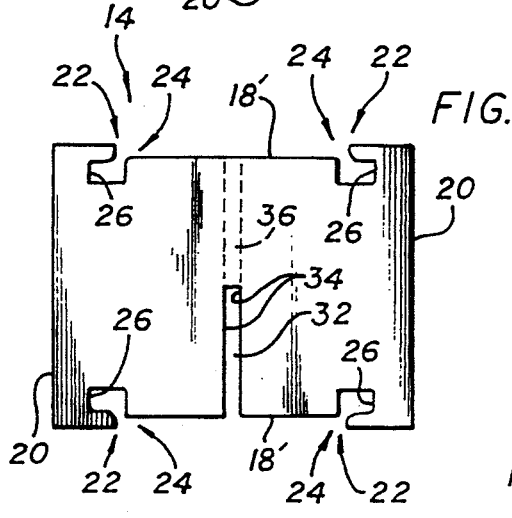
FIG. 3 provides a pattern view or side elevation view of a single one of the pair of panels which cooperatively form the shopper's caddy seen in FIGS. 1 and 2.

Considering now FIG. 3, it is seen that the panels 4a and 14b are identical with one another, and that one of the panels 14 of the caddy 10 is simply inverted from its position of FIG. 3 to allow these two identical panels to interconnect with one another, More particularly, the panel 14 seen in FIG. 3 includes opposite edges 18' either one of which may be a top edge for the caddy 10. Each of the edges 18' defines the same configuration of bag engagement features 22 with recesses 24, and reentrant surface portion 26. The panel 14 defines a centrally located slot 32 extending half way between the edges 18'. This slot 32 has a width just slightly wider than the thickness of the panel 14, and includes opposite slot edge surfaces 34. Aligned with the slot 32 and extending the remainder of the way to the opposite edge 18' the panel 14 defines a support surface portion 36.

As FIG. 1 shows, when two of the identical panels 14 are connected with one another to form the caddy 10, the slot 32 accepts the other panel, and each panel engages its slot edge surfaces 34 with the support surface portions 36 of the other panel so that the pair of panels members are mutually supporting of one another. To assemble the caddy, the user simply slides the two panels 14 together. Knock down of the unloaded caddy requires simply sliding the two panels 14 apart. It should be noted, viewing FIG. 5, that the panels 14 can not separate when the caddy 10 is filled with grocery bags because the weight of the groceries forces panel 14b down on and into connection with the panel 14a.

Further, viewing FIG. 1, it is seen that the caddy 10 is reversible. That is, the caddy 10 may be flipped over and is structurally and functionally the same regardless of which edge 18' is forming the top edge of the caddy. The edge 18' of the panels 14 which is not serving as the top edge of the caddy simply forms the lower edges upon which the caddy rests on the floor 12. The bag engagement features 22 at these lower edges are not used and are spares for use in the event that the bag-engagement features 22 of one of the panels is damaged. When the user of the caddy 10 takes two of the panels 14 to assemble them into a complete caddy, it makes no difference which one is selected first. The first panel is simply positioned on the floor 12 with its slot 32 opening upwardly, and the second panel 14 is inserted into the slot 32 of the first panel with its corresponding slot 32 opening downwardly. The slot side edge surfaces 34 will somewhat frictionally engage the support surface portions 36 so that the caddy is stable and does not come apart simply from the motions of the vehicle in which it is carried, even if the caddy is empty.

However, identity of the panels 14 and the reversibility feature of the caddy 10 also greatly extends its service life because if a bag engagement feature 22 of a panel 14 should be damaged as mentioned above, the caddy 10 can be assembled with the damaged feature 22 at the bottom of that particular panel 14 of the caddy, and full utility for the caddy is preserved. This reversibility feature has another advantageous aspect with respect to usable life of the caddy 10. Because the caddy is anticipated to be low in cost, a preferred material of construction is corrugated sheet material, perhaps in a two-ply grade with the corrugations of the two plies perpendicular to one another for extra strength and durability. While corrugated paper board or cardboard will serve adequately for making a low-cost caddy according to the present invention, a preferred material is corrugated plastic sheet material, or plywood, for example. The corrugated plastic sheet material particularly is easily patterned by die cutting or by high-speed water jet cutting, for example. This corrugated plastic sheet material also has adequate strength to support filled plastic grocery bags, especially in the two-ply grade. Further, this corrugated plastic sheet material is also available from a variety of sources, and in a variety of pleasing colors.

A number of sheet materials which can be used to make the present caddy, including the corrugated plastic sheet material, provide smooth surfaces upon which durable informational messages or advertisements may be placed, by silk screen or offset printing, for example. This aspect of the present inventive shopper's caddy is particularly important because manufacturing costs for the caddy may be reduced to such a low level that advertisers will provide consumers with the caddy at little or no cost. Thus, the advantages of the invention may be made generally available to the grocery-buying public at little or no cost. Thus, through its wide-spread use, the present shopper's caddy also promotes the use and acceptance of light-weight plastic grocery bags. These bags have a favorable environmental impact compared to paper grocery bags. However, as is known, consumer acceptance of these bags has been less than enthusiastic because of the problem of these limp bags allowing their contents to escape during transportation from the store to the consumer's home. The increased use of plastic grocery bags may prevent the destruction of valuable forest lands, and also saves natural resources in other respects as well because of reduced weight and volume shipping requirements for the plastic bags in comparison with paper bags. Consequently, the savings in reduced fuel requirements for shipping plastic bags partially offsets the petrochemicals used in the manufacture of such bags.

However, with use over a period of time it is foreseeable that one of the panels of the caddy 10 will be damaged to the point of no longer being usable. In this case, and with general availability of caddies 10 according to the present invention which use identical panels 14, surviving usable panels from two separate caddies 10 can be combined to make a caddy with still more usable life. Thus, the present invention further saves resources because of the identity and interchangeability of the panels 14.

According to the exemplary preferred embodiment of the invention as depicted, the caddy 10 is dimensioned to be about 16 inches high and to have a length for each panel 14 of about 20 inches. The caddy 10 as so dimensioned will accept a pair of filled grocery bags 28 into each of the areas 16, with part of the weight of each bag resting on the floor 12. The portion of the weight of the grocery bags which is transferred to the caddy 10 stabilizes the caddy and the grocery bags. As mentioned above, the shopper's caddy 10 as so dimensioned and configured will support about 12 filled plastic grocery bags.

Figure 2:
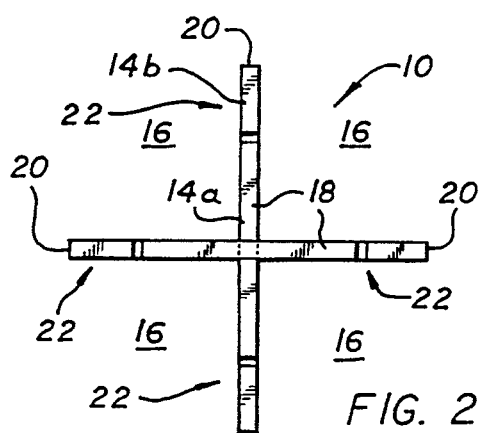
FIG. 2 is a plan view of the shopper's caddy seen in FIG. 1.
Figure 4A:
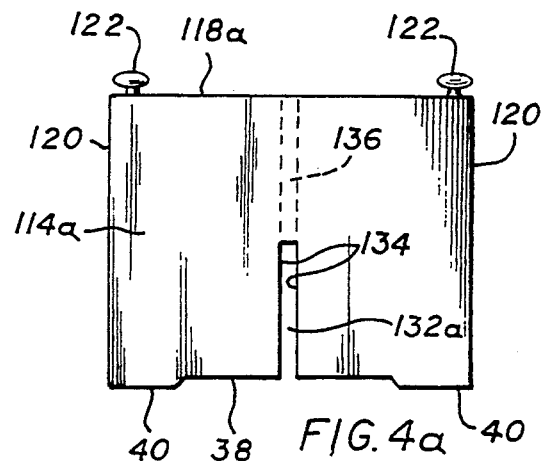
FIGS. 4a and 4b provide pattern or side elevation views of panel members which cooperatively form an alternative embodiment of a shopper's caddy according to the present invention.
Figure 4B:
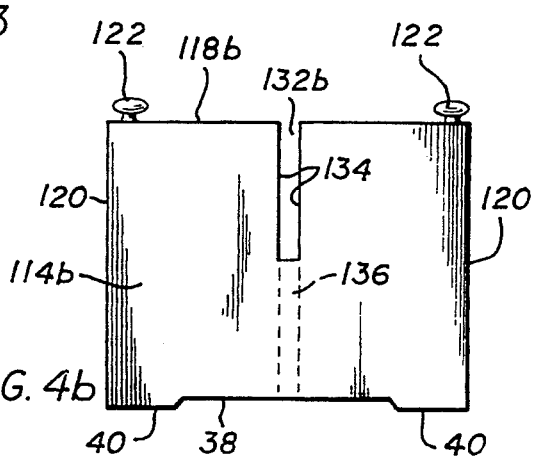

Considering now FIGS. 4a and 4b, an alternative embodiment of the present invention is depicted. In order to obtain reference numerals for use in describing the embodiment of FIGS. 4, features which are analogous in structure or function to those depicted and described with reference to FIGS. 1-3, are referenced on FIGS. 4 with the same numeral used previously, and having 100 added thereto.

Viewing FIGS. 4, the panel portions 114a/114b of the alternative embodiment of caddy 110 are depicted in elevation or pattern view. That is, the panels 114a/114b are depicted as each would appear immediately prior to their connection together. It is seen viewing FIGS. 4 that the panels 114a/114b are not identical. FIG. 4a depicts the "top" panel of the caddy, which includes a top edge 118a, and a bottom edge 38a with a pair of downwardly extending foot portions 40. A slot 132a with slot side edge surfaces 134 extends upwardly from the middle of the bottom edge 38a on the panel 114a. At the top edge 118a adjacent to the side edges 120, the panel 114a includes a pair of upwardly extending knob or protrusion features 122, which are analogous to the bag engagement features 22 of the embodiment of the invention depicted in FIGS. 1-3.

The other panel 114b seen in FIG. 4b, has similar knob or protrusion features 122 adjacent to the side edges 120. However, this panel includes a slot 132b extending downwardly into the panel 114b from the top edge 118b. As will be easily understood, the two panels 114a/114b may connect like the panels 14 described above, and may support filled plastic grocery bags from the protrusion features 122.

FIGS. 3 and 4 make clear that the knocked-down condition of the caddy 10 provides merely a pair of flat panels 14, or 114a/114b, to be stored by the user. Because these panels are flat, rectangular, and are not very large, they may conveniently lay against a trunk side wall, or they may lay flat on the trunk floor 12. Also, the user may slip these panels under the carpeting of the trunk floor so that in storage, the panels 14 take up virtually no trunk space, and are conveniently prevented from shifting around in the trunk during motion of the automobile by the overlying trunk carpeting.

While the present invention has been depicted, described, and is defined by reference to particularly preferred embodiments of the invention, such reference does not imply a limitation on the invention, and no such limitation is to be inferred. The invention is capable of considerable modification, alteration, and equivalents in form and function, as will occur to those ordinarily skilled in the pertinent arts. The depicted and described preferred embodiments of the invention are exemplary only, and are not exhaustive of the scope of the invention. Consequently, the invention is intended to be limited only by the spirit and scope of the appended claims, giving full cognizance to equivalents in all respects.

I claim:

1. A shopper's caddy for supporting a filled limp plastic grocery bag, said shopper's caddy comprising: a pair of panel members each configured to connect with the other in cooperative mutually-supporting angular configuration to define a bag-receiving area therebetween, each one of said pair of panel members at a top edge thereof including a bag-engagement feature for supporting a corresponding one of a pair of handles of said plastic grocery bag, whereby said plastic grocery bag is supported in said bag-receiving area between said angularly disposed mutually-supporting panel members and spans between said bag-engagement features of said pair of panel members.

2. The shopper's caddy of claim 1 wherein said pair of panel members each define a centrally located slot with slot edge surfaces and an aligned support surface portion.

3. The shopper's caddy of claim 2 wherein said centrally located slot extends vertically of each of said pair of panel members about half the vertical extent of each of one of said panel members of said pair of panel members.

4. The shopper's caddy of claim 3 wherein said caddy defines a cruciform shape in plan view, and said caddy defines four bag-receiving areas.

5. The shopper's caddy of claim 4 wherein each of said pair of panel members includes a bag-engagement feature adjacent to opposite side edges thereof.

6. The shopper's caddy of claim 1 wherein said pair of panel members are identical to one another.

7. The shopper's caddy of claim 1 wherein said caddy consists essentially of said pair of panel members.

8. The shopper's caddy of claim 7 wherein said caddy consists exclusively of said pair of panel members.

9. A method of supporting a filled limp plastic grocery bag having a pair of integral loop handles upon a floor so that the contents of said grocery bag are not allowed to escape the bag despite motion thereof as occurs during transportation in an automotive vehicle, said method including the steps of:
    providing a pair of support members;
    angularly disposing and connecting said pair of support members so that said pair of support members are mutually supportive upon said floor and cooperatively define a bag-receiving area in which said filled grocery bag may rest upon said floor;
    providing on each of said pair of support members a corresponding bag-engagement feature spaced above said floor for supportively receiving a respective one of the pair of integral loop handles of said grocery bag;
    supporting said filled plastic grocery bag upon said support members so that a portion of the weight of said contents rests upon said floor and the remainder of the weight of said contents hangs from said pair of support members to stabilize the latter.

10. The method of claim 9 further including the steps of:
configuring said pair of support members as a pair of panels each of which is centrally slotted about half of its height dimension so that said panels mutually connect in a cruciform configuration;
employing said connected panels to define four bag-receiving areas upon said floor; and
providing a bag-engagement feature on each of said pair of panels adjacent to a side edge thereof;

11. A shopper's caddy apparatus for hangingly supporting upon a floor plural filled limp plastic grocery bags which each have a pair of integral loop handles, said shopper's caddy comprising:
a pair of complimentary mutually-supportive separable panel members which when interconnected form a mutually-supporting cruciform configuration in plan view, said cruciform configuration having four bag-receiving areas within which filled plastic grocery bags may hang from said pair of panel members and be partially supported upon said floor;
each one of said pair of panel members being generally rectangular in elevation view with a pair of opposite edges, one opposite edge of which will be a top edge for said panel when interconnected with the other panel of said pair, and a pair of side edges, each panel member including a pair of bag-engagement features on said top edge, each one of said pair of bag-engagement features being adjacent to a corresponding one of said pair of side edges thereof, each panel member further including a centrally-located vertically-extending slot extending about half the central vertical dimension of said panel, said slot defining slot side surfaces which are supportingly engageable with the other of said pair of panel members when the latter are interconnected, and each panel member also defining a support surface aligned with said slot for supportingly engaging the slot side edge surfaces of the other of said pair of panel members.

12. The shopper's caddy of claim 11 wherein said pair of panel members are identical with one another and include bag-engagement features on each of said pair of opposite edges.

13. A shopper's caddy for supporting a filled limp plastic grocery bag, said shopper's caddy comprising: a pair of panel members each configured to connect with the other in cooperative mutually-supporting angular configuration to define a bag-receiving area therebetween, each one of said pair of panel members at a top edge thereof including a bag-engagement feature for supporting a corresponding one of a pair of handles of said plastic grocery bag, whereby said plastic grocery bag is supported in said bag-receiving area between said angularly disposed mutually-supporting panel members and spans between said bag-engagement features of said pair of panel members; wherein said pair of panel members each define a centrally located slot with slot edge surfaces and an aligned support surface portion; said centrally located slot extends vertically of each of said pair of panel members about half the vertical extent of each of one of said panel members of said pair of panel members; wherein said caddy defines a cruciform shape in plan view, and said caddy defines four bag-receiving areas; wherein each of said pair of panel members includes a bag-engagement feature adjacent to opposite side edges thereof; and wherein said bag-engagement feature includes a top edge surface of said panel members defining a recess, and an inwardly disposed reentrant surface portion spaced inwardly of said side edges.

14. The shopper's caddy of claim 13 wherein said bag-engagement feature includes a top edge of said pair of panel members defining an upwardly extending protrusion adjacent to said side edge surface.

15. The shopper's caddy of claim 14 wherein said protrusion is defined by a knob member secured to said top edge surface and spaced inwardly of said side edges.

16. The shopper's caddy of claim 13 wherein said pair of panel members are identical to one another, and each one of said pair of panel members also includes a pair of opposite edges either one of which may be a top edge for said panel member, each panel member including a pair of bag-engagement features on each of said pair of opposite edges adjacent to said side edges.

17. A method of supporting a filled limp plastic grocery bag having a pair of integral loop handles upon a floor so that the contents of said grocery bag are not allowed to escape the bag despite motion thereof as occurs during transportation in an automotive vehicle, said method including the steps of:
providing a pair of support members;
angularly disposing and connecting said pair of support members so that said pair of support members are mutually supportive upon said floor and cooperatively define a bag-receiving area in which said filled grocery bag may rest upon said floor;
providing on each of said pair of support members a corresponding bag-engagement feature spaced above said floor for supportively receiving a respective one of the pair of integral loop handles of said grocery bag;
supporting said filled plastic grocery bag upon said support members so that a portion of the weight of said contents rests upon said floor and the remainder of the weight of said contents hangs from said pair of support members to stabilize the latter;
configuring said pair of support members as a pair of panels each of which is centrally slotted about half of its height dimension so that said panels mutually connect in a cruciform configuration;
employing said connected panels to define four bag-receiving areas upon said floor;
providing a bag-engagement feature on each of said pair of panels adjacent to a side edge thereof;
configuring said pair of panel members to be identical with one another;
configuring said pair of panel members to each have a pair of opposite edges either one of which may be a top edge for said panels; and
providing a pair of bag-engagement features on each of said opposite edges of said panel members.

18. The method of claim 17 further including the step of configuring said bag-engagement feature to include a top edge of said panel members defining a recess and a reentrant surface portion disposed away from the adjacent side edge of said panel member.

19. A shopper's caddy apparatus for hangingly supporting upon a floor plural filled limp plastic grocery bags which each have a pair of integral loop handles, said shopper's caddy comprising:
a pair of complimentary mutually-supportive separable panel members which when interconnected form a mutually-supporting cruciform configuration in plan view, said cruciform configuration having four bag-receiving areas within which filled plastic grocery bags may hang from said pair of panel members and be partially supported upon said floor;

each one of said pair of panel members being generally rectangular in elevation view with a pair of opposite edges, one opposite edge of which will be a top edge for said panel when interconnected with the other panel of said pair, and a pair of side edges, each panel member including a pair of bag-engagement features on said top edge, each one of said pair of bag-engagement features being adjacent to a corresponding one of said pair of side edges thereof, each panel member further including a centrally-located vertically-extending slot extending about half the central vertical dimension of said panel, said slot defining slot side surfaces which are supportingly engageable with the other of said pair of panel members when the latter are interconnected, and each panel member also defining a support surface aligned with said slot for supportingly engaging the slot side edge surfaces of the other of said pair of panel members; and wherein said bag-engagement features each include said one opposite edge defining a recess and a reentrant surface portion disposed away from the adjacent side edge of said panel member.

20. The shopper's caddy of claim 19 wherein said pair of panel members are not identical to one another, one of said pair of panel members including said centrally-located slot which extends downwardly therein from said top edge thereof, and the other of said pair of panel members including said centrally-located slot which extends upwardly therein from a bottom edge thereof, said bag engagement features being selected from the group including: a recess on said top panel member edge, an upwardly extending protrusion on said panel member top edge, and a knob member secured to said panel member top edge.

* * * * *